United States Patent
Zhang et al.

(10) Patent No.: US 12,420,187 B2
(45) Date of Patent: Sep. 23, 2025

(54) INFORMATION DISPLAY METHOD AND APPARATUS, TERMINAL, STORAGE MEDIUM, AND COMPUTER PROGRAM PRODUCT

(71) Applicant: Tencent Technology (Shenzhen) Company Limited, Shenzhen (CN)

(72) Inventors: Yaowen Zhang, Shenzhen (CN); Qinghua Xiao, Shenzhen (CN); Xinglin Zhang, Shenzhen (CN); Qilin Liu, Shenzhen (CN); Zhenzhi Hong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 559 days.

(21) Appl. No.: 17/731,167

(22) Filed: Apr. 27, 2022

(65) Prior Publication Data
US 2022/0362668 A1 Nov. 17, 2022

Related U.S. Application Data (63) Continuation of application No. PCT/CN2021/126619, filed on Oct. 27, 2021.

(30) Foreign Application Priority Data

May 14, 2021 (CN) .................. 202110528866.X (51) Int. Cl.
*A63F 13/533* (2014.01)
*A63F 13/70* (2014.01)
(Continued)

(52) U.S. Cl.
CPC ............ *A63F 13/533* (2014.09); *A63F 13/70* (2014.09); *G06F 3/0481* (2013.01); *G06F 3/0484* (2013.01); *G06F 3/04842* (2013.01)

(58) Field of Classification Search
CPC ...... A63F 13/533; A63F 13/70; G06F 3/0481; G06F 3/0484; G06F 3/04842
See application file for complete search history.

(56) References Cited

U.S. PATENT DOCUMENTS

| | | |
|---|---|---|
| 2014/0024457 A1 | 1/2014 | Justice et al. |
| 2018/0095518 A1* | 4/2018 | Guo .................. H04W 52/0251 |

(Continued)

FOREIGN PATENT DOCUMENTS

| | | |
|---|---|---|
| CN | 105278809 A | 1/2016 |
| CN | 105283233 A | 1/2016 |

(Continued)

OTHER PUBLICATIONS

Tencent Technology, ISR, PCT/CN2021/126619, Feb. 11, 2022, 2 pgs.

(Continued)

*Primary Examiner* — Stephen S Hong
*Assistant Examiner* — Darrin Hope
(74) *Attorney, Agent, or Firm* — Morgan, Lewis & Bockius LLP (57) ABSTRACT

This application discloses an information display method performed by a terminal. The method includes: displaying a user interface of a target application; displaying mandatory reading information and first prompt information corresponding to the mandatory reading information in the user interface in response to a display trigger operation; and displaying second prompt information corresponding to the mandatory reading information in the user interface in response to an end of a mandatory reading time. In this application, a user is prevented within a mandatory reading time from triggering a trigger operation to which a client needs to respond, processing overheads of detecting trigger operations by the client are reduced, and the user is pre- (Continued)

vented from getting upset about not being able to determine whether the mandatory reading time has ended, thereby improving user experience.

20 Claims, 7 Drawing Sheets

(51) Int. Cl.
*G06F 3/0481* (2022.01)
*G06F 3/0484* (2022.01)
*G06F 3/04842* (2022.01)

(56) References Cited

U.S. PATENT DOCUMENTS

| | | | | |
|---|---|---|---|---|
| 2020/0174661 | A1* | 6/2020 | Liang | A63F 13/90 |
| 2021/0252412 | A1* | 8/2021 | Langrand | A63F 13/69 |
| 2021/0260475 | A1* | 8/2021 | Dzjind | A63F 13/86 |

FOREIGN PATENT DOCUMENTS

| | | |
|---|---|---|
| CN | 106528058 A | 3/2017 |
| CN | 108881606 A | 11/2018 |
| CN | 109542289 A | 3/2019 |
| CN | 110141869 A | 8/2019 |
| CN | 111672126 A | 9/2020 |
| CN | 111760272 A | 10/2020 |
| CN | 113134234 A | 7/2021 |
| EP | 0531060 A2 | 8/1992 |
| JP | H 05128302 A | 5/1993 |
| WO | WO 2014015207 A1 | 1/2014 |

OTHER PUBLICATIONS

"Aviutl: Prepare Loading Screen", Feb. 15, 2021, 12 pgs., Retrieved from the Internet: https://ambergonslibrary.com/aviutl/3313/.

Game videos never live, "[Sekiro: Sekiro] Loading screen", YouTube, 3 pgs., Retrieved from the Internet: https://www.youtube.com/watch?v=ASxVkT3QwIk.

Tencent Technology, Korean Office Action, KR Patent Application No. 10-2022-7026093, Jun. 24, 2024, 12 pgs.

Twenty_Seven, "Realize a Countdown of N Seconds Before Other Operations Can Be Performed. Applicable to the Declaration of Corresponding Regulations and Legal Conditions in the Initial Part of the Business Process (ie, Mandatory Reading and Waiting)", CSDN, Jan. 10, 2020, 5 pgs., Retrieved from the Internet: https://blog.csdn.net/qq_40959340/article/details/103925577.

Tencent Technology, WO, PCT/CN2021/126619, Feb. 11, 2022, 5 pgs.

Tencent Technology, IPRP, PCT/CN2021/126619, Nov. 14, 2023, 6 pgs.

Sina Games, "Beginner's Guide Enter the Game and the Game Lobby", Mar. 25, 2005, 5 pgs., Retrieved from the Internet: http://games.sina.com.cn/o/z/jyt/2005-03-25/215551.shtml.

* cited by examiner

INFORMATION DISPLAY METHOD AND APPARATUS, TERMINAL, STORAGE MEDIUM, AND COMPUTER PROGRAM PRODUCT

CROSS-REFERENCE TO RELATED APPLICATIONS

This application is a continuation application of PCT Patent Application No. PCT/CN2021/126619, entitled "INFORMATION DISPLAY METHOD, DEVICE, TERMINAL, STORAGE MEDIUM AND COMPUTER PROGRAM PRODUCT" filed on Oct. 27, 2021, which claims priority to Chinese Patent Application No. 202110528866.X, filed with the State Intellectual Property Office of the People's Republic of China on May 14, 2021, and entitled "INFORMATION DISPLAY METHOD AND APPARATUS, TERMINAL, AND STORAGE MEDIUM", all of which are incorporated herein by reference in their entirety.

FIELD OF THE TECHNOLOGY

This application relates to the field of computer and Internet technologies, and in particular, to an information display method and apparatus, a terminal, a storage medium, and a computer program product.

BACKGROUND OF THE DISCLOSURE

Currently, as gameplay becomes increasingly complex, it is necessary to display reading information related to gameplay before a game match starts, so that a user can easily understand the specific gameplay of a game.

In related technologies, a user interface displays mandatory reading information to introduce the specific gameplay of a game to a user. Moreover, during the mandatory reading of the mandatory reading information, when detecting a trigger operation of the user, a client skips responding to the trigger operation.

However, because the user cannot determine when the client starts to respond to a trigger operation, the user tends to perform the trigger operation repeatedly within a time period during which the client skips responding to a trigger operation, resulting in high processing overheads of the client.

SUMMARY

Embodiments of this application provide an information display method and apparatus, a terminal, a storage medium, and a computer program product, which can reduce processing overheads of a client in terms of detecting trigger operations. The technical solutions are as follows.

According to an aspect of the embodiments of this application, an information display method is provided, performed by a terminal, the method including:

displaying a user interface of a game application;

displaying mandatory reading information and first prompt information corresponding to the mandatory reading information in the user interface in response to a display trigger operation, the first prompt information being used for indicating that the mandatory reading information is in a mandatory display state, the user interface skipping responding to a trigger operation in the mandatory display state of the mandatory reading information; and displaying second prompt information corresponding to the mandatory reading information in the user interface in response to an end of the mandatory display state, the second prompt information being used for indicating that the mandatory reading information is in a normal display state, the user interface responding to the trigger operation in the normal display state of the mandatory reading information.

According to an aspect of the embodiments of this application, an information display apparatus is provided, the apparatus including:

a user interface display module, configured to display a user interface of a game application;

a first prompt display module, configured to display mandatory reading information and first prompt information corresponding to the mandatory reading information in the user interface in response to a display trigger operation, the first prompt information being used for indicating that the mandatory reading information is in a mandatory display state, the user interface skipping responding to a trigger operation in the mandatory display state of the mandatory reading information; and a second prompt display module, configured to display second prompt information corresponding to the mandatory reading information in the user interface in response to an end of the mandatory display state, the second prompt information being used for indicating that the mandatory reading information is in a normal display state, the user interface responding to the trigger operation in the normal display state of the mandatory reading information.

According to an aspect of the embodiments of this application, a terminal is provided and includes a processor and a memory, the memory storing at least one instruction, at least one program, a code set, or an instruction set, the at least one instruction, the at least one program, the code set, or the instruction set being loaded and executed by the processor to implement the foregoing information display method.

According to an aspect of the embodiments of this application, a computer-readable storage medium is provided and stores at least one instruction, at least one program, a code set, or an instruction set, the at least one instruction, the at least one program, the code set, or the instruction set being loaded and executed by a processor to implement the foregoing information display method.

According to an aspect of the embodiments of this application, a computer program product or a computer program is provided, the computer program product or the computer program including computer instructions, the computer instructions being stored in a computer-readable storage medium, a processor of a terminal reading the computer instructions from the computer-readable storage medium, and executing the computer instructions, to cause the terminal to perform the foregoing information display method.

The technical solutions provided in the embodiments of this application may bring the following beneficial effects:

First prompt information is used for displaying to a user that a mandatory reading time of mandatory reading information has not ended, to prevent the user from triggering within the mandatory reading time a trigger operation to which a client needs to respond, thereby reducing processing overheads of detecting trigger operations by the client. Moreover, second prompt information is used for displaying to the user that the mandatory reading time has ended, so that after a mandatory reading duration corresponding to the mandatory reading information has ended, the user can trigger and generate in time a trigger operation to which the client needs to respond, to prevent the user from getting upset about not being able to determine whether the mandatory reading time has ended, thereby improving user experience.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application. A person of ordinary skill in the art may still derive other drawings according to these accompanying drawings without creative efforts.

DESCRIPTION OF EMBODIMENTS

To make objectives, technical solutions, and advantages of this application clearer, the following further describes implementations of this application in detail with reference to the accompanying drawings.

Figure 1:
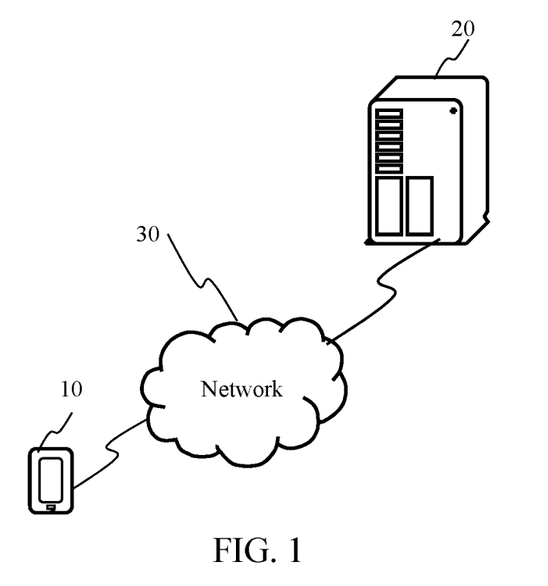
FIG. 1 is a schematic diagram of an application running environment according to an embodiment of this application.

FIG. 1 is a schematic diagram of an application running environment according to an embodiment of this application. The application running environment may include a terminal 10 and a server 20.

The terminal 10 may be an electronic device such as a mobile phone, a tablet computer, a game console, an ebook reader, a multimedia player, a wearable device, or a personal computer (PC). The terminal 10 may install a client of a target application, for example, the target application may be a game application, a reading application, a shopping application, a browser, and the like. The target application may be an application that needs to be downloaded and installed, or may be a click-to-use application, and this is not limited in this embodiment of this application.

The server 20 is configured to provide a backend service for the client of the target application in the terminal 10. For example, the server 20 may be a backend server of the target application. The server 20 may be one server, a server cluster including a plurality of servers, or a cloud computing service center. In some embodiments, the server 20 provides backend services for target applications in a plurality of terminals 10.

In some embodiments, the terminal 10 may communicate with the server 20 through a network 30.

Figure 2:
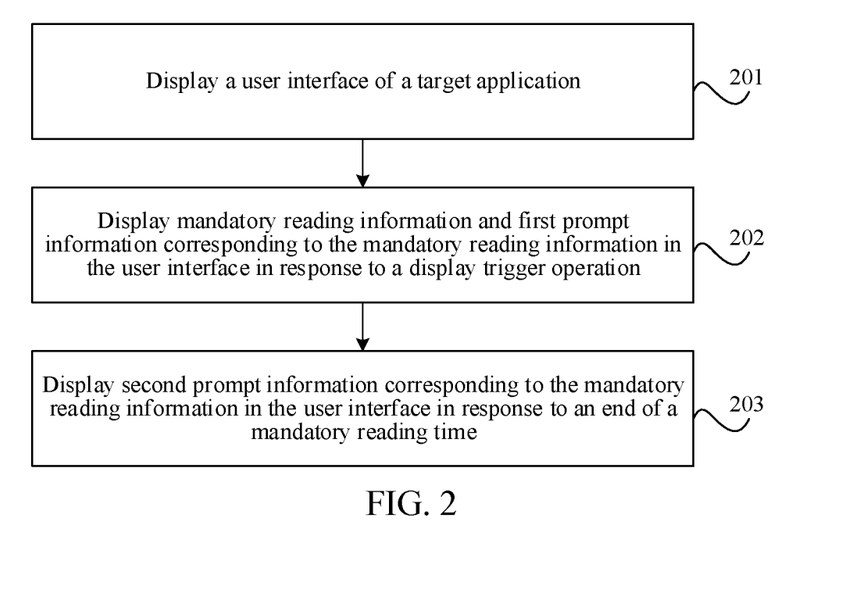
FIG. 2 is a flowchart of an information display method according to an embodiment of this application.

FIG. 2 is a flowchart of an information display method according to an embodiment of this application. The method may be applied to the terminal 10 in the application running environment shown in FIG. 1. For example, the steps may be performed by the client of the target application installed on and running in the terminal 10. The method may include the following steps (201 to 203):

Step 201. Display a user interface of a target application.

The target application refers to any application with an information display function, for example, a game application, a reading application or a shopping application.

The user interface refers to an interface displayed by the target application to a user through a terminal screen. In some embodiments, user interfaces corresponding to different target applications contain different content. For example, if the target application is a game application, the user interface may include a virtual object controlled by the user and a virtual environment for the virtual object to move. If the target application is a reading application, the user interface may include an article to be read. If the target application is a shopping application, the user interface includes an item displayed by a merchant to the user.

In an embodiment of this application, the client displays the user interface of the target application before displaying mandatory reading information. In some embodiments, the client displays the user interface of the target application after detecting a startup operation on the target application. The startup operation may be triggered and generated by the user, and may be a click operation on a display icon of the target application. Certainly, in an exemplary embodiment, the startup operation may be any other operation, for example, a swipe operation, a drag operation, a gesture operation or a voice operation. This is not limited in the embodiments of this application.

In some embodiments, the user interfaces corresponding to different target applications have different display manners.

In a possible implementation, to ensure the timeliness of displaying the user interface, when displaying the user interface, the target application renders the user interface according to display elements stored by the client, and presents the user interface to the user after the user interface is rendered. In some embodiments, the stored display elements are stored when the target application is downloaded. Alternatively, the stored display elements are stored after a previous startup of the target application. Certainly, in an exemplary embodiment, when the target application is not started, the client may further acquire new display elements from a server at a particular time interval, and use the new display elements to update the previously stored display elements. When updating the previously stored display elements, the client may directly use the new display elements to cover the previously stored display elements, or acquire display elements different from the previously stored display elements according to the new display elements, and perform operations such as addition, deletion, and replacement on the different display elements.

In another possible implementation, to ensure the real-time performance of displaying the user interface, when displaying the user interface, the target application acquires display elements of the target application by using the server, then renders the user interface according to the display elements, and presents the user interface to the user after the user interface is rendered.

The foregoing display elements include, but not limited to, at least one of the following: a text element, an image element, a sound element, and the like.

In some embodiments, the target application in this application may also be referred to as a game application.

Step 202. Display mandatory reading information and first prompt information corresponding to the mandatory reading information in the user interface in response to a display trigger operation.

The mandatory reading information is information that is mandatory for the user to read. In some embodiments, when displaying the mandatory reading information, the client skips responding to a trigger operation on any content in the target application. That is, after the mandatory reading information starts to be displayed, the user cannot trigger and generate any other operation within a period of time, so as to ensure a reading effect of the user in the mandatory reading information. The mandatory reading information may include text information, image information, animation information, voice information, and the like. This is not limited in the embodiments of this application.

In some embodiments, the mandatory reading information may be mandatory reading information set by a designer of the target application, or may be mandatory reading information set by the user according to an actual case.

In a possible implementation, the mandatory reading information may be set by the designer of the target application. In some embodiments, the target application corresponds to a plurality of pieces of reading information, and different reading information have different importance levels. The designer selects important reading information as the mandatory reading information according to an actual case. The importance levels may be determined according to the types of the reading information. For example, if the reading information is an introduction to a use rule for an important unit (for example, an important function) of the target application, it is determined that the reading information is important reading information. If the reading information is information displayed for the first time for a user account, it is determined that the reading information is important reading information. The user account is an account used by the user for the target application. In some embodiments, different target applications correspond to different mandatory reading information. For example, if the target application is a game application, the mandatory reading information is game rule introduction information. If the target application is a reading application, the mandatory reading information is introduction information of an article retrieval method. If the target application is a shopping application, the mandatory reading information is introduction information of a red envelope acquisition method.

In another possible implementation, the mandatory reading information may be set by the user according to an actual case. In some embodiments, the target application corresponds to a plurality of pieces of reading information. The user may select one or more pieces of reading information as the mandatory reading information for content of the reading information according to an actual case of the user. Correspondingly, after detecting a mandatory reading selection operation on a piece of reading information by the user, the client adds a mandatory reading marker to the reading information, and then skips responding to a trigger operation on any content in the target application during displaying of the reading information. For example, the user may select according to an actual case reading information that is difficult and requires many times to memorize as the mandatory reading information.

For example, if the user has not started the target application for a long time (for example, one month, twelve months or one year), the client starts the target application and displays an information setting interface when detecting a startup operation on the target application. The information setting interface includes selection items of various pieces of reading information contained in the target application. Further, when detecting a selection operation of the user on a selection item of a piece of reading information, the client determines that a mandatory reading selection operation on the reading information by the user is received, and then adds the mandatory reading marker to the reading information. The mandatory reading marker is used for indicating that the reading information is the mandatory reading information. In this case, the user may set unfamiliar reading information as mandatory reading information according to previous knowledge of the target application, and perform no extra operation on familiar reading information, thereby improving reading experience of the user and reducing an amount of calculation caused for the client to display unnecessary mandatory reading information.

In an embodiment of this application, after displaying the user interface of the target application, the client detects the user interface, and displays the mandatory reading information and the first prompt information corresponding to the mandatory reading information in the user interface when detecting a display trigger operation. The first prompt information is used for indicating that a mandatory reading time of the mandatory reading information has not ended. The display trigger operation is an operation triggered and generated by the user, and is used for prompting the client to display the mandatory reading information. In some embodiments, different mandatory reading information corresponds to different display trigger operations. For example, if the foregoing mandatory reading information is introduction information of a game function, the foregoing display trigger operation is a first use operation of the user on the game function. If the foregoing mandatory reading information is introduction information of a target chapter in a novel, the foregoing display trigger operation is an end reading operation of the user on a previous chapter of the target chapter.

A case that the mandatory reading time of the mandatory reading information has not ended may also be referred to as a case that the mandatory reading information is in a mandatory display state. That is, the foregoing first prompt information is used for indicating that the mandatory reading information is in the mandatory display state. In the mandatory display state of the mandatory reading information, the foregoing user interface skips responding to a trigger operation, and the trigger operation refers to any operation triggered and generated by the user on the target application.

In some embodiments, in an embodiment of this application, when displaying the foregoing mandatory reading information, the client acquires an amount of information contained in the mandatory reading information, and determines a size parameter of a display window of the mandatory reading information based on the amount of information. The size parameter refers to a minimum size parameter for displaying all content of the mandatory reading information. Next, the client displays the display window in the user interface based on the size parameter, and displays the mandatory reading information and the first prompt information corresponding to the mandatory reading information in the display window.

In some embodiments, the mandatory reading information in this application may also be referred to as game rule introduction information. For example, the game rule introduction information includes, but not limited to, at least one of the following: a game beginner tutorial, a game mode introduction, a game function introduction, and the like. In some embodiments, the game beginner tutorial is displayed when the user starts the foregoing game application for the first time. In some embodiments, when the user participates in a game mode for the first time, the game mode introduction may be displayed introduction information for the game mode. Alternatively, when the user has not participated in a game mode for a long time (for example, one month, six months, twelve months or one year), the game mode introduction may be introduction information of the game mode displayed when the user participates in the game mode again. In some embodiments, when the user uses a game function for the first time, the game function introduction may be introduction information displayed for the game function. Alternatively, when the user has not used a game function for a long time (for example, one week, one month, six months, twelve months or one year), the game function introduction may be introduction information displayed for the game mode when the user uses the game function again.

Step 203. Display second prompt information corresponding to the mandatory reading information in the user interface in response to an end of a mandatory reading time.

In an embodiment of this application, after displaying the first prompt information, the client displays the second prompt information corresponding to the mandatory reading information in the user interface when the mandatory reading time has ended. The second prompt information is used for indicating that the mandatory reading time has ended.

The end of the mandatory reading time may also be referred to as an end of the mandatory display state, and after the mandatory display state has ended, the mandatory reading information is in a normal display state. The second prompt information is used for indicating that the mandatory reading information is in the normal display state. In the normal display state of the mandatory reading information, the foregoing user interface responds to the trigger operation, and the trigger operation refers to any operation triggered and generated by the user on the target application.

In some embodiments, the client may determine, according to a display status of the mandatory reading information, whether the mandatory reading time has ended; or, the client may determine, according to a display status of the first prompt information, whether the mandatory reading time has ended.

In a possible implementation, after displaying the mandatory reading information and the first prompt information, the client monitors a display duration of the mandatory reading information. When the display duration of the mandatory reading information is greater than or equal to a mandatory reading duration, it is determined that the mandatory reading time has ended, and the second prompt information is displayed in the user interface.

Figure 3:
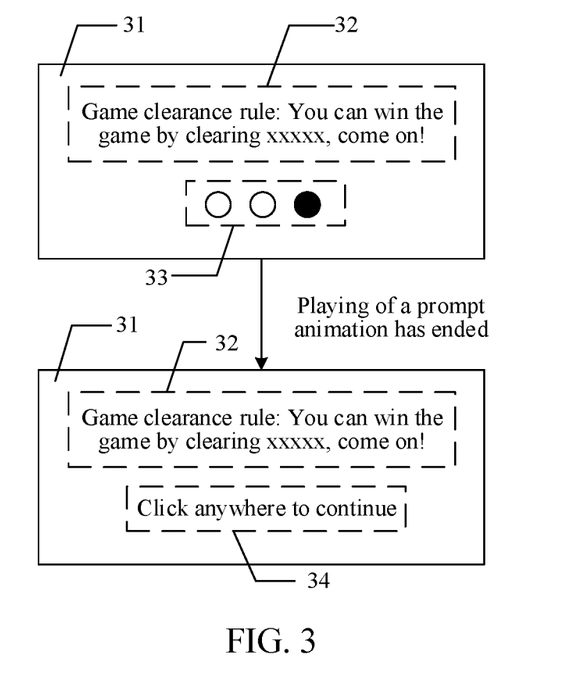
FIG. 3 is an exemplary schematic diagram of switching display of prompt information.

In another possible implementation, the first prompt information includes a prompt animation. After displaying the mandatory reading information and the first prompt information, the client monitors the first prompt information. When playing of a prompt animation corresponding to the first prompt information has ended, it is determined that the mandatory reading time has ended, and the second prompt information corresponding to the mandatory reading information is displayed in the user interface. A total duration of the prompt animation corresponding to the first prompt information is equal to a total duration of the mandatory reading time. Moreover, the total duration of the mandatory reading time may also be referred to as a total display duration of the mandatory display state. That is, the total duration of the prompt animation corresponding to the first prompt information is equal to the total display duration of the mandatory display state. For example, as shown in FIG. 3, a display window 31 includes mandatory reading information 32 and first prompt information 33, and the first prompt information 33 is a prompt animation. After playing of the prompt animation has ended, the mandatory reading information 32 and second prompt information 34 are displayed in the display window 31.

In summary, in the technical solutions provided in this embodiment of this application, first prompt information is used for displaying to a user that a mandatory reading time of mandatory reading information has not ended, to prevent the user from triggering within the mandatory reading time a trigger operation to which a client needs to respond, thereby reducing processing overheads of detecting trigger operations by the client. Moreover, second prompt information is used for displaying to the user that the mandatory reading time has ended, so that after a mandatory reading duration corresponding to the mandatory reading information has ended, the user can trigger and generate in time a trigger operation to which the client needs to respond, to prevent the user from getting upset about not being able to determine whether the mandatory reading time has ended, thereby improving user experience.

In addition, when the mandatory reading information is displayed, a display window with a minimum size required for mandatory information is determined according to an amount of information contained in the mandatory reading information, thereby reducing processing overheads of the client in displaying the mandatory reading information.

Next, content contained in the foregoing first prompt information is described.

In a possible implementation, the first prompt information is only used for indicating that the mandatory reading time of the mandatory reading information has not ended. In this case, the first prompt information includes, but not limited to, at least one of the following: a prompt animation in which a plurality of dot interface elements are highlighted alternately and cyclically, a prompt animation in which a bar interface element is highlighted in different positions alternately and cyclically, a prompt animation in which an annular interface element is highlighted in different positions alternately and cyclically, and the like.

In some embodiments, the first prompt information includes a prompt animation in which a plurality of dot interface elements are highlighted alternately and cyclically. After the client displays the first prompt information, the plurality of dot interface elements in the first prompt information are highlighted alternately and cyclically, and each dot interface element is highlighted alternately as a loop animation. The loop animation is played according to a first time interval. The first time interval may be any value less than a total duration of the mandatory reading time. For example, when the first time interval is acquired, the total duration of the mandatory reading time may be acquired, and then the first time interval is determined based on the total duration of the mandatory reading time and a quantity of times that the loop animation has been played.

In some embodiments, the first prompt information includes a prompt animation in which a bar interface element is highlighted in different positions alternately and cyclically. After the client displays the first prompt information, the bar interface element in the first prompt information is highlighted in different positions alternately, and the bar interface element is highlighted in the positions alternatively as a loop animation. The loop animation is played according to a second time interval. The second time interval may be any value less than the total duration of the mandatory reading time. For example, when the second time interval is acquired, the total duration of the mandatory reading time may be acquired, and then the second time interval is determined based on the total duration of the mandatory reading time and a quantity of times that the loop animation has been played.

In some embodiments, the first prompt information includes a prompt animation in which an annular interface element is highlighted in different positions alternately and cyclically. After the client displays the first prompt information, the annular interface element in the first prompt information is highlighted in different positions alternately, and the annular interface element is highlighted in the positions alternatively as a loop animation. The loop animation is played according to a third time interval. The third time interval may be any value less than the total duration of the mandatory reading time. For example, when the third time interval is acquired, the total duration of the mandatory reading time may be acquired, and then the third time interval is determined based on the total duration of the mandatory reading time and a quantity of times that the loop animation has been played.

In another possible implementation, the first prompt information is used for indicating that the mandatory reading time of the mandatory reading information has not ended, and is further used for indicating reading progress of the mandatory reading information. The reading progress refers to a ratio of a reading duration to the total duration of the mandatory reading time, and/or, a ratio of the remaining reading duration to the total duration of the mandatory reading time. The reading duration refers to a display duration of the mandatory reading information, and the sum of the reading duration and the remaining reading duration is equal to the total duration of the mandatory reading time. In this case, the first prompt information includes, but not limited to, at least one of the following: a prompt animation in which a plurality of dot interface elements are highlighted alternately and sequentially according to the reading progress, a prompt animation in which a bar interface element changes a display pattern according to the reading progress, a prompt animation in which an annular interface element changes a display pattern according to the reading progress, and the like.

Figure 4:
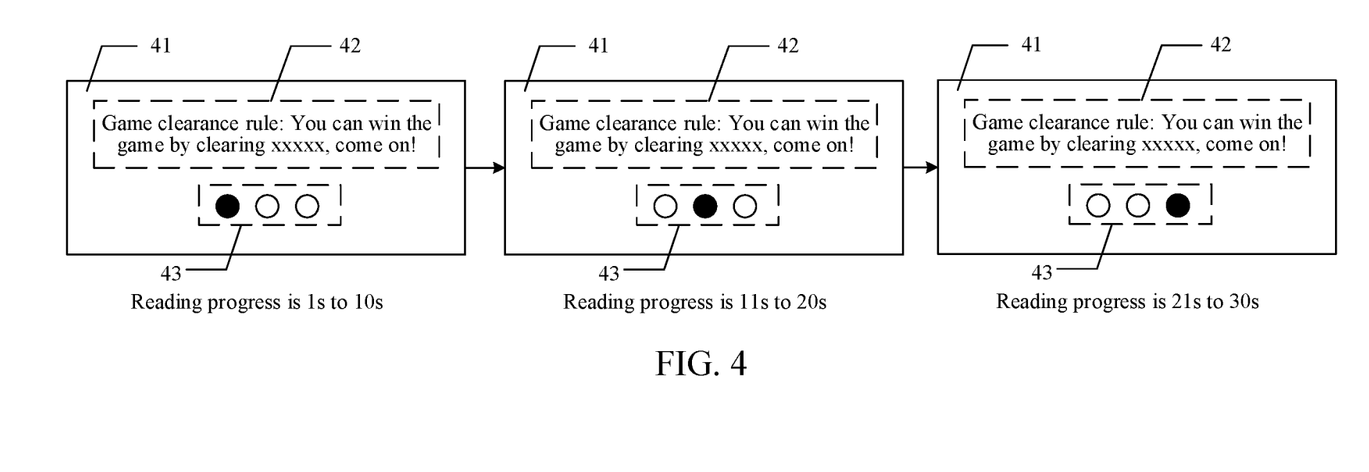
FIG. 4 to FIG. 6 are exemplary schematic diagrams of display manners of first prompt information.

In some embodiments, the first prompt information includes a prompt animation in which a plurality of dot interface elements are highlighted alternately and sequentially according to the reading progress. After the client displays the first prompt information, a display interval between the dot interface elements is determined based on a quantity of the dot interface elements and the total duration of the mandatory reading time, and then the plurality of dot interface elements are highlighted sequentially according to the reading progress in combination with the display interval between the dot interface element. For example, as shown in FIG. 4, a display window 41 includes mandatory reading information 42 and first prompt information 43, the first prompt information 43 includes three dot interface elements, and a total duration of the mandatory reading time of the mandatory reading information 42 is 30 s. At this time, the display interval between the dot interface element is 10 s. Subsequently, from left to right, within the reading progress of $0s$ to $10s$, the first dot interface element in the first prompt information 43 is highlighted; within the reading progress of $11s$ to $20s$, the second dot interface element in the first prompt information 43 is highlighted; and within the reading progress of $21s$ to $30s$, the third dot interface element in the first prompt information 43 is highlighted.

Figure 5:
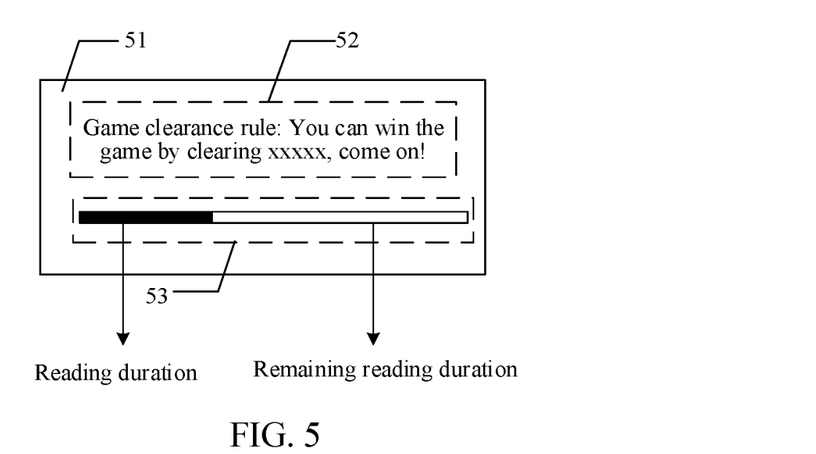

In some embodiments, the first prompt information includes a prompt animation in which a bar interface element changes a display pattern according to the reading progress. After the client displays the first prompt information, the display pattern of the bar interface element is changed based on a change in the reading progress. For example, as shown in FIG. 5, a display window 51 includes mandatory reading information 52 and first prompt information 53, and the first prompt information 53 includes a bar interface element. Subsequently, according to the change in the reading progress, a reading duration and the remaining reading duration of the mandatory reading information are determined, and the reading duration and the remaining reading duration are marked in the bar interface element. Further, as the reading progress changes, the reading duration and the remaining reading duration change, and the display pattern of the bar interface element also changes.

Figure 6:
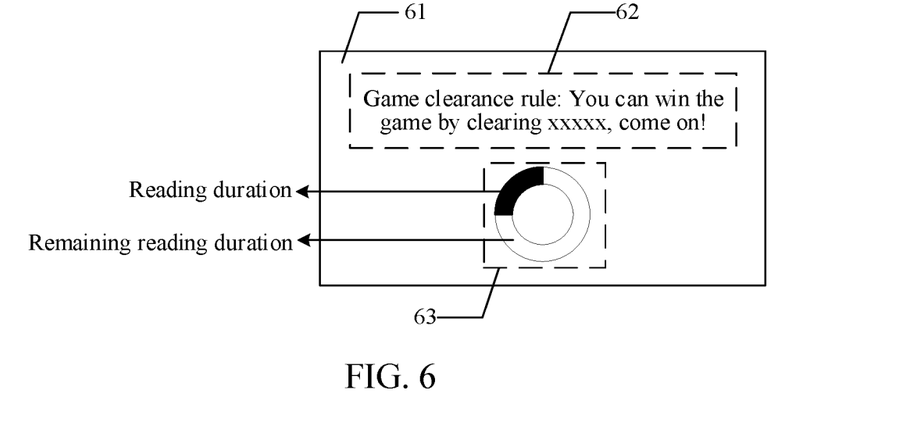

In some embodiments, the first prompt information includes a prompt animation in which an annular interface element changes a display pattern according to the reading progress. After the client displays the first prompt information, the display pattern of the annular interface element is changed based on a change in the reading progress. For example, as shown in FIG. 6, a display window 61 includes mandatory reading information 62 and first prompt information 63, and the first prompt information 63 includes an annular interface element. Subsequently, according to the change in the reading progress, a reading duration and the remaining reading duration of the mandatory reading information are determined, and the reading duration and the remaining reading duration are marked in the annular interface element. Further, as the reading progress changes, the reading duration and the remaining reading duration change, and the display pattern of the annular interface element also changes.

Figure 7:
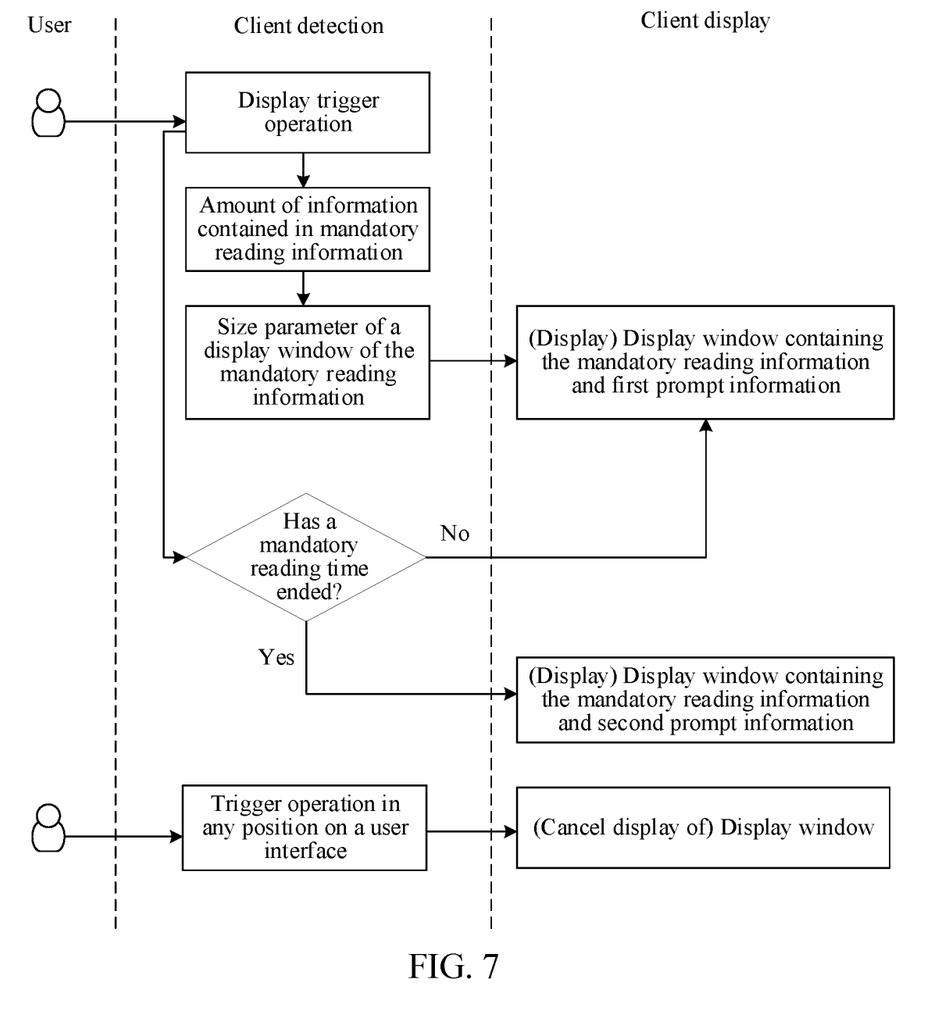
FIG. 7 is an exemplary schematic diagram of an information display manner.

In addition, this application is completely described with reference to FIG. 7. During the running of a target application, after detecting a display trigger operation, a client acquires an amount of information contained in mandatory reading information, determines a size parameter of a display window of the mandatory reading information based on the amount of information, and then displays the display window containing the mandatory reading information and first prompt information in a user interface. Subsequently, the client detects a mandatory reading time of the mandatory reading information, and changes the first prompt information in the display window to second prompt information when the mandatory reading time has ended. Subsequently, the client cancels display of the display window after detecting a trigger operation in any position by a user on the user interface.

Figure 8:
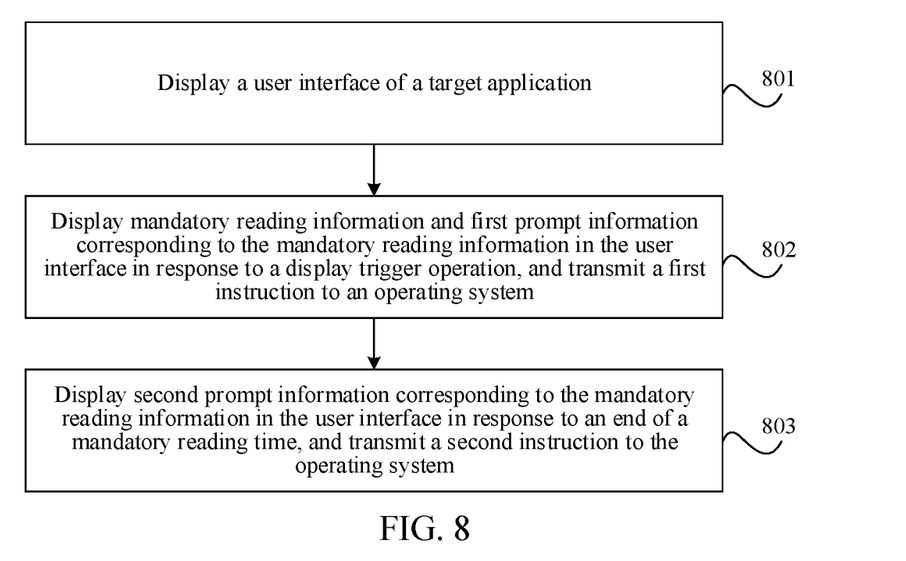
FIG. 8 is a flowchart of an information display method according to another embodiment of this application.

FIG. 8 is a flowchart of an information display method according to another embodiment of this application. The method may be applied to the terminal 10 in the application running environment shown in FIG. 1. For example, the step may be performed by the client of the target application installed on and running in the terminal 10. The method may include the following steps (801 to 803):

Step 801. Display a user interface of a target application.

Step 801 is the same as step 201 in the embodiment of FIG. 2. For details, reference is made to the embodiment of FIG. 2. Details are not described herein again.

Step 802. Display mandatory reading information and first prompt information corresponding to the mandatory reading information in the user interface in response to a display trigger operation, and transmit a first instruction to an operating system.

In an embodiment of this application, after displaying the user interface, the client detects the user interface, displays the mandatory reading information and the first prompt information corresponding to the mandatory reading information in the user interface when detecting the display trigger operation, and transmits the first instruction to the operating system.

The operating system is a computer program for managing hardware and software resources of a terminal. In some embodiments, the operating system may be any type of operating systems, such as an Android operating system, an iOS operating system, a Windows operating system, or any other customized operating system based on the Android operating system, or a self-developed operating system. This is not limited in this embodiment of this application. The first instruction is used for instructing the operating system to control a terminal screen to enter a power saving working state, and the terminal screen skips receiving a trigger operation on the user interface in the power saving working state.

The skipping receiving the trigger operation on the user interface means that the user interface does not perform any processing on the trigger operation. For example, in a normal working state, when a user generates a trigger operation on the user interface, the user interface perceives the trigger operation and converts the trigger operation into an electrical signal. The client displays, based on the electrical signal, information triggered by the trigger operation in the user interface. In the power saving working state, when the user generates a trigger operation in the user interface, the user interface skips perceiving the trigger operation and skips converting the trigger operation into an electrical signal.

In some embodiments, in an embodiment of this application, the client determines, according to a total duration of the mandatory reading information, whether to transmit the first instruction to the operating system. In some embodiments, before transmitting the first instruction, the client acquires a total duration of a mandatory reading time. Further, if the total duration of the mandatory reading time is greater than a threshold, it is determined that the mandatory reading time is relatively long. To reduce power consumption of the terminal screen, the first instruction is transmitted to the operating system while the mandatory reading information and the first prompt information are displayed. If the total duration of the mandatory reading time is less than or equal to the threshold, it is determined that the mandatory reading time is relatively short. To reduce data transmission overheads, it is not necessary to transmit the first instruction to the operating system while the mandatory reading information and the first prompt information are displayed.

Step 803: Display second prompt information corresponding to the mandatory reading information in the user interface in response to an end of a mandatory reading time, and transmit a second instruction to the operating system.

In an embodiment of this application, after displaying the mandatory reading information, the client monitors the mandatory reading time of the mandatory reading information, displays the second prompt information corresponding to the mandatory reading information in the user interface when the mandatory reading time has ended, and transmits the second instruction to the operating system.

The second instruction is used for instructing the operating system to control the terminal screen to return to a normal working state, and the terminal screen receives a trigger operation on the user interface in the normal working state. In some embodiments, after the second prompt information is displayed, the client cancels display of the mandatory reading information in the user interface after detecting a trigger operation in any position on the user interface.

In this application, a terminal screen is used as an example to describe a first instruction and a second instruction. In an exemplary embodiment, before the first instruction is transmitted, the client acquires terminal components associated with mandatory reading information, and further, transmits the first instruction to the terminal components, to enable the terminal components to enter a power saving working state. After the mandatory reading time has ended, the client transmits the second instruction to the terminal components, to enable the terminal components to return to a normal working state. The terminal components refer to components that receive a trigger operation on any content in a target application.

Certainly, in an exemplary embodiment, the terminal components may be flexibly set. A terminal screen is used as an example. It is assumed that the terminal screen includes a first screen area and a second screen area. If the first screen area is used for receiving a trigger operation on content in a target application, and the second screen area is used for receiving the trigger operation on the content in the target application and another operation not related to the target application (for example, a screen brightness adjustment operation), the first instruction includes indication information of the first screen area. After acquiring the first instruction, an operating system controls the first screen area to enter a power saving working state, and the second screen area maintains a normal working state. That is, before transmitting the first instruction, the client acquires the first screen area and the second screen area from the terminal screen. The first screen area is used for receiving the trigger operation on the content in the target application, and the second screen area is used for receiving the another operation not related to the target application. Further, after detecting a display trigger operation, the client generates a first instruction according to the indication information of the first screen area, and transmits the first instruction to an operating system. The first instruction includes the indication information of the first screen area, and the operating system controls the first screen area according to the indication information to enter a power saving working state. The first screen area belongs to the terminal screen. That is, the first screen area may be all or part of the terminal screen.

In some embodiments, the indication information of the first screen area is used for indicating the first screen area in the terminal screen. For example, if each screen area is divided in the terminal screen in advance, the indication information of the first screen area is identification information of the first screen area. If each screen area is not divided in the terminal screen in advance, the indication information of the first screen area is used for indicating a position of the first screen area in the terminal screen.

In summary, in the technical solutions provided in this embodiment of this application, during a mandatory reading time of mandatory reading information, a terminal screen is controlled to be in a power saving working state of skipping receiving a trigger operation on a user interface. After the mandatory reading time of the mandatory reading information has ended, the terminal screen is controlled to return to a normal working state of receiving a trigger operation on the user interface, so as to reduce meaningless processing overheads of a terminal within the mandatory reading time.

The following is an apparatus embodiment of this application, which can be configured to perform the method embodiments of this application. For details not disclosed in the apparatus embodiment of this application, refer to the method embodiments of this application.

Figure 9:
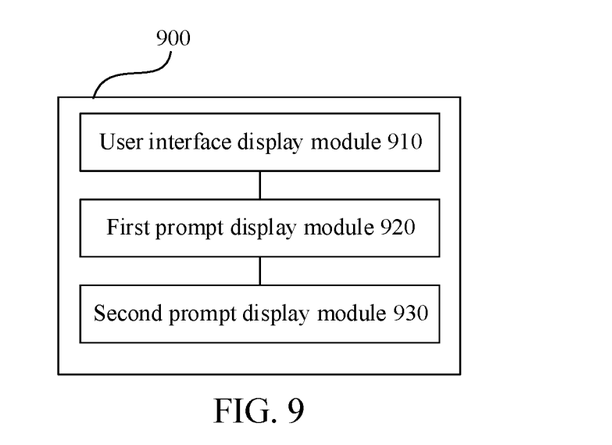
FIG. 9 is a block diagram of an information display apparatus according to an embodiment of this application.

FIG. 9 is a block diagram of an information display apparatus according to an embodiment of this application. The apparatus has functions of implementing the foregoing information display method. The functions may be implemented by hardware, or may be implemented by hardware executing corresponding software. The apparatus may be a terminal or may be disposed in a terminal. The apparatus 900 may include a user interface display module 910, a first prompt display module 920, and a second prompt display module 930.

The user interface display module 910 is configured to display a user interface of a game application.

The first prompt display module 920 is configured to display game rule introduction information and first prompt information corresponding to the game rule introduction information in the user interface in response to a display trigger operation, the first prompt information being used for indicating that the game rule introduction information is in a mandatory display state, the user interface skipping responding to a trigger operation in the mandatory display state of the game rule introduction information.

The second prompt display module 930 is configured to display second prompt information corresponding to the game rule introduction information in the user interface in response to an end of the mandatory display state, the second prompt information being used for indicating that the game rule introduction information is in a normal display state, the user interface responding to the trigger operation in the normal display state of the game rule introduction information.

In an exemplary embodiment, the first prompt information includes at least one of the following: a prompt animation in which a plurality of dot interface elements are highlighted alternately and cyclically; a prompt animation in which a bar interface element is highlighted in different positions alternately and cyclically; and a prompt animation in which an annular interface element is highlighted in different positions alternately and cyclically.

In an exemplary embodiment, the first prompt information is further used for indicating reading progress of the game rule introduction information.

In an exemplary embodiment, the first prompt information includes at least one of the following: a prompt animation in which a plurality of dot interface elements are highlighted alternately and sequentially according to the reading progress; a prompt animation in which a bar interface element changes a display pattern according to the reading progress; and a prompt animation in which an annular interface element changes a display pattern according to the reading progress.

In an exemplary embodiment, the first prompt display module 920 is configured to: acquire an amount of information contained in the game rule introduction information; determine a size parameter of a display window of the game rule introduction information based on the amount of information, the size parameter being a minimum size parameter for displaying all content of the game rule introduction information; and display the display window in the user interface based on the size parameter, and display the game rule introduction information and the first prompt information corresponding to the game rule introduction information in the display window.

In an exemplary embodiment, the second prompt display module 930 is configured to display the second prompt information corresponding to the game rule introduction information in the user interface in response to an end of playing of a prompt animation corresponding to the first prompt information, a total duration of the prompt animation corresponding to the first prompt information being equal to a total display duration of the mandatory display state.

Figure 10:
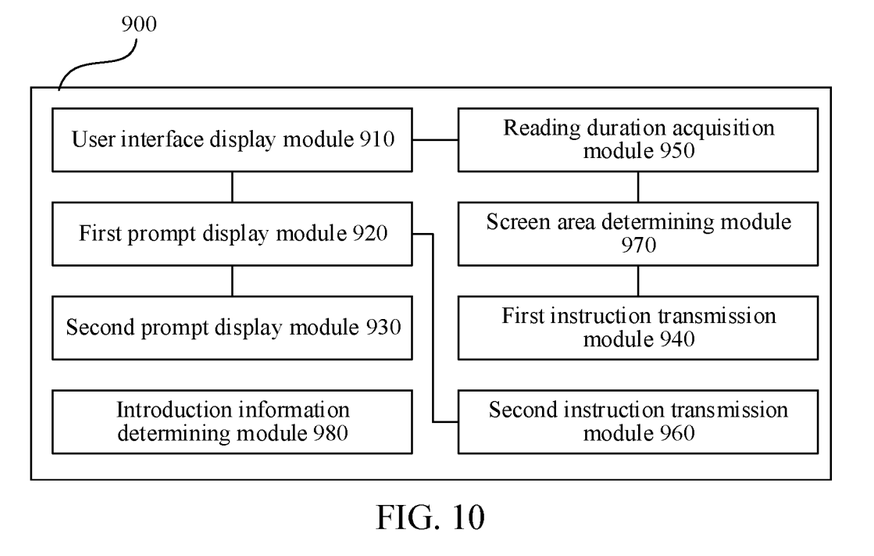
FIG. 10 is a block diagram of an information display apparatus according to another embodiment of this application.

In an exemplary embodiment, as shown in FIG. 10, the apparatus 900 further includes a first instruction transmission module 940.

The first instruction transmission module 940 is configured to transmit a first instruction to an operating system in response to the display trigger operation, the first instruction being used for instructing the operating system to control a terminal screen to enter a power saving working state, the terminal screen skipping receiving a trigger operation on the user interface in the power saving working state.

In an exemplary embodiment, as shown in FIG. 10, the apparatus 900 further includes a reading duration acquisition module 950.

The reading duration acquisition module 950 is configured to acquire the total display duration of the mandatory display state.

The first instruction transmission module 940 is further configured to perform, in response to that the total display duration of the mandatory display state being greater than a threshold, the step of transmitting the first instruction to the operating system.

In an exemplary embodiment, as shown in FIG. 10, the apparatus 900 further includes a second instruction transmission module 960.

The second instruction transmission module 960 is configured to transmit a second instruction to the operating system in response to the end of the mandatory display state, the second instruction being used for instructing the operating system to control the terminal screen to return to a normal working state, the terminal screen receiving the trigger operation on the user interface in the normal working state.

In an exemplary embodiment, the first instruction includes indication information of a first screen area, the operating system controls the first screen area according to the indication information to enter the power saving working state, and the first screen area belongs to the terminal screen.

In an exemplary embodiment, as shown in FIG. 10, the apparatus 900 further includes a screen area determining module 970.

The screen area determining module 970 is configured to determine the first screen area and a second screen area contained in the terminal screen, the first screen area being used for receiving a trigger operation on content in the game application, the second screen area being used for receiving another operation not related to the game application.

The first instruction transmission module 940 is configured to: generate the first instruction according to the indication information of the first screen area in response to the display trigger operation; and transmit the first instruction to the operating system.

In an exemplary embodiment, as shown in FIG. 10, the apparatus 900 further includes an introduction information determining module 980.

The introduction information determining module 980 is configured to add a mandatory reading marker to the reading information in response to a mandatory reading operation on reading information, the mandatory reading marker being used for indicating that the reading information is the mandatory reading information.

In summary, in the technical solutions provided in this embodiment of this application, first prompt information is used for displaying to a user that a mandatory reading time of mandatory reading information has not ended, to prevent the user from triggering within the mandatory reading time a trigger operation to which a client needs to respond, thereby reducing processing overheads of detecting trigger operations by the client. Moreover, second prompt information is used for displaying to the user that the mandatory reading time has ended, so that after a mandatory reading duration corresponding to the mandatory reading information has ended, the user can trigger and generate in time a trigger operation to which the client needs to respond, to prevent the user from getting upset about not being able to determine whether the mandatory reading time has ended, thereby improving user experience.

When the apparatus provided in the foregoing embodiments implements functions of the apparatus, the division of the foregoing functional modules is merely an example for description. In the practical application, the functions may be assigned to and completed by different functional modules as required, that is, the internal structure of the device is divided into different functional modules, to implement all or some of the functions described above. In addition, the apparatus and method embodiments provided in the foregoing embodiments belong to the same conception. For the specific implementation process, reference may be made to the method embodiments, and details are not described herein again.

Figure 11:
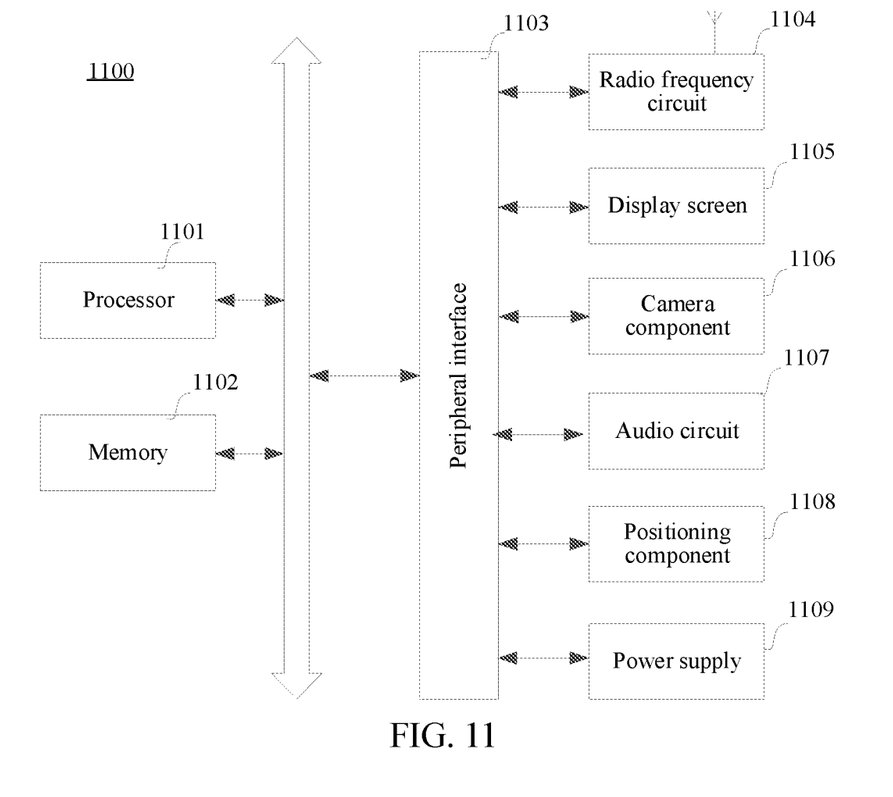
FIG. 11 is a structural block diagram of a terminal according to an embodiment of this application.

FIG. 11 is a structural block diagram of a terminal 1100 according to an embodiment of this application. The terminal 1100 may be an electronic device such as a mobile phone, a tablet computer, a game console, an ebook reader, a multimedia player, a wearable device, or a PC. The terminal is configured to implement the information display method provided in the foregoing embodiments. The terminal may be the terminal 10 in the game running environment shown in FIG. 1. Specifically:

Generally, the terminal 1100 includes a processor 1101 and a memory 1102.

The processor 1101 may include one or more processing cores, and may be, for example, a 4-core processor or an 8-core processor. The processor 1101 may be implemented by using at least one hardware form of a digital signal processor (DSP), a field programmable gate array (FPGA), and a programmable logic array (PLA). The processor 1101 may alternatively include a main processor and a coprocessor. The main processor is configured to process data in an active state, also referred to as a central processing unit (CPU). The coprocessor is a low-power processor configured to process data in a standby state. In some embodiments, the processor 1101 may be integrated with a graphics processing unit (GPU). The GPU is configured to render and draw content that needs to be displayed on a display screen. In some embodiments, the processor 1101 may further include an artificial intelligence (AI) processor. The AI processor is configured to process computing operations related to machine learning.

The memory 1102 may include one or more computer-readable storage media. The computer-readable storage medium may be non-transient. The memory 1102 may further include a high-speed random access memory (RAM) and a nonvolatile memory, for example, one or more disk storage devices or flash storage devices. In some embodiments, the non-transient computer-readable storage medium in the memory 1102 is configured to store at least one instruction, at least one program, a code set, or an instruction set, the at least one instruction, the at least one program, the code set, or the instruction set being executed by one or more processors to implement the foregoing information display method.

In some embodiments, the terminal 1100 may optionally include a peripheral interface 1103 and at least one peripheral. The processor 1101, the memory 1102, and the peripheral interface 1103 may be connected by a bus or a signal line. Each peripheral may be connected to the peripheral interface 1103 by using a bus, a signal cable, or a circuit board. Specifically, the peripheral device includes: at least one of a radio frequency circuit 1104, a display screen 1105, a camera component 1106, an audio circuit 1107, a positioning component 1108, and a power supply 1109.

A person skilled in the art may understand that the structure shown in FIG. 11 does not constitute a limitation to the terminal 1100, and the terminal may include more or fewer components than those shown in the figure, or some components may be combined, or a different component arrangement may be used.

In an exemplary embodiment, a non-transitory computer-readable storage medium is further provided, the storage medium storing at least one instruction, at least one program, a code set, or an instruction set, the at least one instruction, the at least one program, the code set, or the instruction set being executed by a processor to implement the foregoing information display method.

In some embodiments, the computer-readable storage medium may include a read-only memory (ROM), a RAM, a solid state drive (SSD), an optical disc, or the like. The RAM may include a resistance random access memory (ReRAM) and a dynamic random access memory (DRAM).

In an exemplary embodiment, a computer program product or a computer program is provided. The computer program product or the computer program includes computer instructions, and the computer instructions are stored in a computer-readable storage medium. A processor of a terminal reads the computer instructions from the computer-readable storage medium, and executes the computer instructions, to cause the terminal to perform the foregoing information display method.

It is to be understood that "plurality of" mentioned in the specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects. In addition, the step numbers described in this specification merely For example show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The foregoing descriptions are merely exemplary embodiments of this application, but are not intended to limit this application. Any modification, equivalent replacement, improvement, and the like made within the spirit and principle of this application fall within the protection scope of this application.

What is claimed is:

1. An information display method performed by a terminal, the method comprising:
   displaying a user interface of a game application;
   in response to a display trigger operation:
      displaying mandatory reading information and first prompt information corresponding to the mandatory reading information in the user interface, the first prompt information being used for indicating that the mandatory reading information is in a mandatory display state;
      causing a terminal screen of the terminal to enter a power saving working state and skip a trigger operation on the user interface in the power saving working state while displaying the mandatory reading information and the first prompt information on the terminal screen during the mandatory display state on the user interface; and
   in response to an end of the mandatory display state:
      displaying second prompt information corresponding to the mandatory reading information in the user interface, the second prompt information being used for indicating that the mandatory reading information is in a normal display state; and
      causing the terminal screen of the terminal to exit the power saving working state and respond to a trigger operation in the normal display state of the mandatory reading information.

2. The method according to claim 1, wherein the first prompt information comprises at least one of the following:
   a prompt animation in which a plurality of dot interface elements are highlighted alternately and cyclically;
   a prompt animation in which a bar interface element is highlighted in different positions alternately and cyclically; and
   a prompt animation in which an annular interface element is highlighted in different positions alternately and cyclically.

3. The method according to claim 1, wherein the first prompt information is further used for indicating reading progress of the mandatory reading information.

4. The method according to claim 3, wherein the first prompt information comprises at least one of the following:
   a prompt animation in which a plurality of dot interface elements are highlighted alternately and sequentially according to the reading progress;
   a prompt animation in which a bar interface element changes a display pattern according to the reading progress; and
   a prompt animation in which an annular interface element changes a display pattern according to the reading progress.

5. The method according to claim 1, wherein the displaying mandatory reading information and first prompt information corresponding to the mandatory reading information in the user interface comprises:
   acquiring an amount of information contained in the mandatory reading information;
   determining a size parameter of a display window of the mandatory reading information based on the amount of information, the size parameter being a minimum size parameter for displaying all content of the mandatory reading information; and
   displaying the display window in the user interface based on the size parameter, and displaying the mandatory reading information and the first prompt information corresponding to the mandatory reading information in the display window.

6. The method according to claim 1, wherein the displaying second prompt information corresponding to the mandatory reading information in the user interface in response to an end of the mandatory display state comprises:
   displaying the second prompt information corresponding to the mandatory reading information in the user interface in response to an end of playing of a prompt animation corresponding to the first prompt information,
   a total duration of the prompt animation corresponding to the first prompt information being equal to a total display duration of the mandatory display state.

7. The method according to claim 1, further comprising:
   acquiring a total display duration of the mandatory display state; and
   in response to that the total display duration of the mandatory display state being greater than a threshold, transmitting a first instruction to an operating system of the terminal, the first instruction being used for instructing the operating system to control the terminal screen to enter the power saving working state.

8. The method according to claim 1, further comprising:
   adding a mandatory reading marker to the mandatory reading information in response to a mandatory reading operation on the mandatory reading information,
   the mandatory reading marker being used for indicating that the mandatory reading information has the mandatory display state.

9. The method according to claim 1, wherein the mandatory reading information is game rule instruction information of the game application.

10. The method according to claim 7, wherein the first instruction comprises indication information of a first screen area, the operating system controls the first screen area according to the indication information to enter the power saving working state, and the first screen area belongs to the terminal screen.

11. The method according to claim 10, further comprising:
   determining the first screen area and a second screen area contained in the terminal screen, the first screen area being used for receiving a trigger operation on content in the game application, the second screen area being used for receiving another operation not related to the game application; and
   the transmitting a first instruction to an operating system in response to the display trigger operation comprises:
   generating the first instruction according to the indication information of the first screen area in response to the display trigger operation; and
   transmitting the first instruction to the operating system.

12. A terminal, comprising a processor and a memory, the memory storing at least one instruction, at least one program, a code set, or an instruction set, the at least one instruction, the at least one program, the code set, or the instruction set being loaded and executed by the processor and causing the terminal to perform an information display method including:

displaying a user interface of a game application;
in response to a display trigger operation:
displaying mandatory reading information and first prompt information corresponding to the mandatory reading information in the user interface, the first prompt information being used for indicating that the mandatory reading information is in a mandatory display state;
causing a terminal screen of the terminal to enter a power saving working state and skip a trigger operation on the user interface in the power saving working state while displaying the mandatory reading information and the first prompt information on the terminal screen during the mandatory display state on the user interface; and
in response to an end of the mandatory display state:
displaying second prompt information corresponding to the mandatory reading information in the user interface, the second prompt information being used for indicating that the mandatory reading information is in a normal display state; and
causing the terminal screen of the terminal to exit the power saving working state and respond to a trigger operation in the normal display state of the mandatory reading information.

13. The terminal according to claim 12, wherein the first prompt information comprises at least one of the following:
a prompt animation in which a plurality of dot interface elements are highlighted alternately and cyclically;
a prompt animation in which a bar interface element is highlighted in different positions alternately and cyclically; and
a prompt animation in which an annular interface element is highlighted in different positions alternately and cyclically.

14. The terminal according to claim 12, wherein the first prompt information is further used for indicating reading progress of the mandatory reading information.

15. The terminal according to claim 12, wherein the method further comprises:
adding a mandatory reading marker to the mandatory reading information in response to a mandatory reading operation on the mandatory reading information,
the mandatory reading marker being used for indicating that the mandatory reading information has the mandatory display state.

16. The terminal according to claim 12, wherein the mandatory reading information is game rule instruction information of the game application.

17. A non-transitory computer-readable storage medium, storing at least one instruction, at least one program, a code set, or an instruction set, the at least one instruction, the at least one program, the code set, or the instruction set being loaded and executed by a processor of a terminal and causing the terminal to perform an information display method including:

displaying a user interface of a game application;
in response to a display trigger operation:
displaying mandatory reading information and first prompt information corresponding to the mandatory reading information in the user interface, the first prompt information being used for indicating that the mandatory reading information is in a mandatory display state;
causing a terminal screen of the terminal to enter a power saving working state and skip a trigger operation on the user interface in the power saving working state while displaying the mandatory reading information and the first prompt information on the terminal screen during the mandatory display state on the user interface; and
in response to an end of the mandatory display state:
displaying second prompt information corresponding to the mandatory reading information in the user interface, the second prompt information being used for indicating that the mandatory reading information is in a normal display state; and
causing the terminal screen of the terminal to exit the power saving working state and respond to a trigger operation in the normal display state of the mandatory reading information.

18. The non-transitory computer-readable storage medium according to claim 17, wherein the first prompt information comprises at least one of the following:
a prompt animation in which a plurality of dot interface elements are highlighted alternately and cyclically;
a prompt animation in which a bar interface element is highlighted in different positions alternately and cyclically; and
a prompt animation in which an annular interface element is highlighted in different positions alternately and cyclically.

19. The non-transitory computer-readable storage medium according to claim 17, wherein the first prompt information is further used for indicating reading progress of the mandatory reading information.

20. The non-transitory computer-readable storage medium according to claim 17, wherein the method further comprises:
adding a mandatory reading marker to the mandatory reading information in response to a mandatory reading operation on the mandatory reading information,
the mandatory reading marker being used for indicating that the mandatory reading information has the mandatory display state.

* * * * *